United States Patent
Panther (10) Patent No.: US 6,565,464 B1
(45) Date of Patent: May 20, 2003

(54) HYDRAULICALLY CONTROLLED TRANSMISSION

(75) Inventor: Urban Panther, Seelbach (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/658,683

(22) Filed: Sep. 8, 2000

(30) Foreign Application Priority Data

| Sep. 9, 1999 | (DE) | 199 43 012 |
| Sep. 9, 1999 | (DE) | 199 43 009 |
| Sep. 13, 1999 | (DE) | 199 43 680 |
| Sep. 14, 1999 | (DE) | 199 43 927 |

(51) Int. Cl.$^7$ .............................................. F16H 63/00
(52) U.S. Cl. .................................. 474/28; 285/123.15
(58) Field of Search .................. 474/18, 28; 285/123.1, 285/123.15

(56) References Cited

U.S. PATENT DOCUMENTS

| 5,879,253 A | * | 3/1999 | Friedmann et al. ........... 474/18 |
| 6,205,887 B1 | * | 3/2001 | Barnreiter et al. ............. 74/335 |
| 6,241,635 B1 | * | 6/2001 | Schmid et al. ................. 474/11 |

* cited by examiner

Primary Examiner—David A. Bucci
Assistant Examiner—Vicky A. Johnson
(74) Attorney, Agent, or Firm—Darby & Darby (57) ABSTRACT

A transmission has a hydraulic control device (200) to pressurize actuating members arranged on a rotary shaft (280) through a fluid connection between the stationary hydraulic device and the rotary shaft. The fluid connection consists of coaxial tubular elements (220, 240) with a tubular passage channel between the inner and outer tubular elements. The tubular elements have sealed connections (221, 223, 243, 244) with the rotary shaft and the hydraulic device.

14 Claims, 5 Drawing Sheets

HYDRAULICALLY CONTROLLED TRANSMISSION

BACKGROUND OF THE INVENTION

The invention relates to a transmission with a hydraulic control system for the controlled pressurization of actuating members that are arranged on at least one rotary shaft, with a hydraulic control device that has at least two control device plates, an intermediate layer between the control device plates, and a hydraulic connection between the hydraulic control device and the rotary shaft.

For the hydraulic control of actuating members on rotating transmission shafts of a vehicle it is necessary to provide a reliable and essentially fluid-tight connection between a stationary control device and a rotary shaft.

OBJECT OF THE INVENTION

It is therefore the object of the present invention to provide a transmission of the kind introduced above with a fluid connection of low complexity and high reliability, so that the reliable operation of the vehicle is not put at risk by hydraulic failures or break-downs of the fluid system.

SUMMARY OF THE INVENTION

In a transmission according to the invention, the foregoing objective is met by an arrangement where the connection between a stationary control device and a rotary shaft (subsequently called rotary connection) consists of two essentially coaxial tubular elements that are at one axial end seated in receiving portions of the shaft and at the opposite axial end received in a stepped bore hole of one of the control device plates, where the intermediate layer serves as axial constraint of one of the tubular elements.

It is advantageous if the stepped bore hole has at least two axial sections of different diameter and if each of the two at least approximately coaxial tubular elements is at one axial end seated in a respective bore-hole section in a fluid-tight arrangement by means of a seal.

It is also advantageous if the radially inner tubular element receives a flow of fluid through an opening in the intermediate layer.

It is further of practical advantage, if the radially outer tubular element receives a flow of fluid through a passage that leads from a radially off-centered channel in a control device plate through an oblique or transverse bore hole into an intermediate space of the stepped bore hole and into the tubular passage channel between the two tubular elements. The oblique or transverse bore hole can be drilled with the tool entering from the outside of the control device plate through the stepped bore hole that receives the tubular elements or from the side facing the intermediate layer. By selecting an appropriately small diameter size for the oblique or transverse bore hole, the latter can have the effect of a throttle or shutter. The same applies to horizontal bore holes (i.e., parallel to the shaft), e.g., in the intermediate layer.

According to a further concept of the invention, it is advantageous if the oblique or transverse bore hole leads into a spatial portion, such as the aforementioned intermediate space, that is arranged between the two seals of the tubular elements.

In transmissions with a hydraulic control system for the controlled pressurization of actuating members that are arranged on at least one rotary shaft, with a hydraulic control device that has at least two control device plates, an intermediate layer between the control device plates, and a hydraulic connection between the hydraulic control device and the rotary shaft, the objective of the invention is met furthermore by an arrangement where the rotary connection consists of two essentially coaxial tubular elements that have at one axial end a sealed engagement in receiving portions of the shaft and are received at the opposite axial end in a stepped bore hole of an extension of the control device. At least two channels are arranged essentially parallel to each other in the extension and are connected by the tubular elements to channels that run inside the shaft.

It is further advantageous, if the stepped bore hole in the extension has at least two axial sections of different diameter size and if each of the two at least approximately coaxial tubular elements is at one axial end seated in a respective bore-hole section in a fluid-tight arrangement by means of a seal. It is also of practical benefit, if the stepped bore hole has sections of four different diameter sizes. A further practical advantage arises if the stepped bore hole cuts into the two channels of the extension.

According to a further concept of the invention, it is advantageous if at least one transition between sections of different diameter in the stepped bore hole is designed as a shoulder that serves as an axial constraint of a tubular element.

It is practical if the radially inner tubular element is connected to a first channel of the extension and supplied with a flow of fluid by a section of the stepped bore hole.

It is advantageous if the fluid enters the radially outer tubular element from a second channel in the extension (where the stepped bore hole cuts into said channel) by way of a space between the seals of the two tubular elements that leads into the tubular passage channel between the coaxially arranged tubular elements. It is advantageous if the channels in the extension are closed off by cover plugs.

In accordance with a further concept of the invention, it is of practical benefit if a portion of a cover plug is configured to take up axial forces acting in the direction towards the shaft, so that the plug can serve as a constraint for a tubular element.

According to a further concept of the invention, it is advantageous if at least one tubular element is axially secured by means of a holder element.

The holder element in a practical embodiment of the foregoing concept is configured as a sheet-metal piece with a fork that engages a groove of the tubular element. It is also of practical benefit if the holder element is fastened to the control device, e.g., by a screw connection.

The novel features that are considered as characteristic of the invention are set forth in particular in the appended claims. The improved apparatus itself, however, both as to its construction and its mode of operations, together with additional features and advantages thereof, will be best understood upon perusal of the following detailed description of certain presently preferred specific embodiments with reference to the accompanying drawing.

BRIEF DESCRIPTION OF THE DRAWINGS

The details of the invention will be discussed on the basis of the attached drawing, wherein.

DETAILED DESCRIPTION OF THE INVENTION

Figure 1:
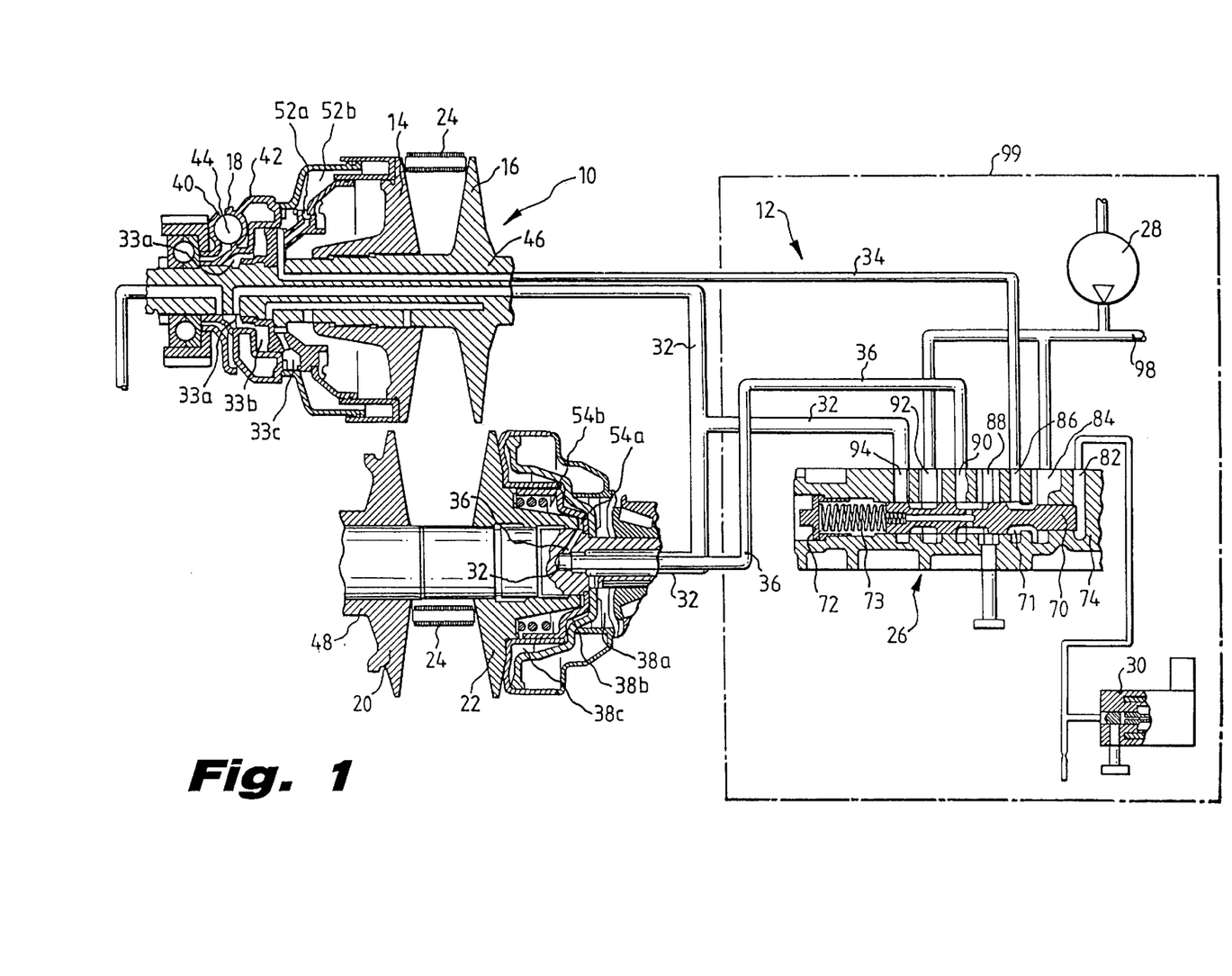
FIG. 1 represents a transmission with a hydraulic system.

FIG. 1 gives a schematic view of a first embodiment serving as an example of the invention. The continuously variable transmission 10, as used specifically in a motor vehicle (not shown), is controlled by a hydraulic system 12. The hydraulic system consists of a control device with valves, valve pistons and connecting conduits. The transmission has two independent actuator-cylinder systems to control, respectively, the setting of the transmission ratio of the gripping pressure applied to the chain belt. In the arrangement of FIG. 1, two actuator cylinders are arranged at each of the two pairs of conical pulley discs. To supply pressure medium to the two independent actuator cylinders, the shafts of the disc pairs have at least two supply conduits 32, 34 or 32, 36, respectively, receiving fluid from the control device 99 by way of the rotary connection.

In particular, the continuously variable transmission 10 has a first pair of pulley discs 14, 16 with a torque-sensor device 18, a second pair of pulley discs 20, 22, as well as a torque-transmitting device in the form of a chain 24 that runs in a loop around the disc pairs.

The first disc pair 14, 16 has a conical disc 16 arranged essentially in an axially fixed position, and a conical disc 14 which, in the illustrated example, is arranged to be axially movable on the fixed conical disc 16. In a preferred arrangement, the distance between the disc pairs 14, 16 and 20, 22 is variable. With particular preference, however, the disc pairs are at a fixed distance from each other.

In particular, a non-variable distance between the disc pairs has the effect that by closing one disc pair, i.e., by narrowing the gap either between the discs 14 and 16 or between the discs 20 and 22, and chain 24 is caused to migrate radially outwards in the narrowing gap. However, because the chain has a defined, invariable length, the outward radial migration of the chain at one of the disc pairs 14, 16 or 20, 22, respectively, causes a commensurate inward migration of the chain at the other disc pair 20, 22 or 14, 16, respectively, at least in the assumed case of an invariable distance between the disc pairs. The inward radial migration, in turn causes the respective disc pair to open, i.e., to increase the gap between the discs of that pair.

Thus, when the discs of one of the pairs 14, 16 or 20, 22 are closed or pushed together, this has the effect of opening or pushing apart the other disc pair. Because the opening and closing of the disc pairs is accompanied by a change in the contact radius with the chain, i.e., the radius at which the force is transferred, the result is a change of the transmission ratio of the transmission 10. Depending on whether an external force is applied to the disc pair 14, 16 or the disc pair 20, 22, the transmission is shifted, respectively, in the direction towards "overdrive" or in the direction towards "underdrive". It should be noted that this applies to the illustrated example of FIG. 1, where the disc pair 14, 16 is arranged at the input side, i.e., the driven side of the transmission, while the disc pair 20, 22 is arranged at the output side.

It should be noted that the aforementioned shift movements of the discs are attributable to a net resultant force imbalance. This means in particular, that a force applied to one of the disc pairs will not cause a transmission shift, if a substantially equal force is applied to the other disc pair. For further clarification, there will also be no shifting movement in the disc pairs, even if the external forces applied to the movable discs 14 and 22 are unequal, if the disc pairs are overall in equilibrium.

The shifting movement of the disc pairs or, more precisely, the application of a corresponding shifting force according to the invention is performed in particular by the hydraulic system 12.

The hydraulic system 12 has a special two-fold function:

On the one hand, the hydraulic system generates a ratio-maintaining pressure on the disc pairs 14, 16 and 20, 22. The ratio-maintaining pressure ensures that a present ratio of the transmission 10 remains unchanged, particularly while the transmission is running, unless a ratio shift is expressly called for. On the other hand, the hydraulic system also serves to change the setting of the transmission ratio. This particular purpose is accomplished by applying an additional amount of pressure to one of the pairs of conical discs. In particular, the additional pressure is applied to the disc pair where at that point in time the chain 24 is running at a smaller contact radius. However, it should be noted that other ways of applying pressure to the discs are also within the scope of preferred embodiments. The aforementioned way of applying pressure is indicated, e.g., in the case where the chain is pushed radially outwards when an axial force is applied to the respective disc pair 14, 16 or 20, 22.

The control of the ratio-maintaining pressure and the ratio-shifting pressure is performed by a valve device 26. The valve device 26 is connected on the one hand to a hydraulic source (e.g., a pump) 28 and, on the other hand, to a proportional valve device 30 that generates a biasing pressure. The downstream side of the valve device 26 (which will be described in more detail in the contact of FIG. 2) in the hydraulic flow is connected to the hydraulic conduit systems 32, 34, 36.

In particular, the valve device 26 allows the control of the intensity and/or direction of the volume flow through the hydraulic conduit systems 32, 34, 36.

The opposite or downstream ends (in relation to the valve device 26) of the hydraulic conduit systems 32, 34, 36 are connected to chambers or chamber systems that are associated with or included in the transmission 10.

Thus, a compressive contact force, preferably controllable in magnitude, is generated in the disc pairs 14, 16 and 20, 22 through the pressure conduit 32 and the chamber systems 33a, 33b, 33c and 38a, 38b, 38c.

Preferably, the torque sensor 18 is used to regulate, control or set the compressive contact force dependent on engine torque.

For example, the torque sensor can have a first, axially fixed part 40 and a second, movable part 42, with the two parts arranged to be rotatable in relation to each other at least through a segmental angular range. At least one of the two parts 40 and 42 has a curve disc or axially rising ramp with a gap-holder body, shown as a ball 44 in the illustrated example, arranged between the two parts.

The amount of rotation of the second movable part 42 in relation to the first fixed part 40 depends on the amount of engine torque or, more precisely, on the amount of torque applied to the torque sensor 18. The rotation causes the ball 44 to move up the ramp, thereby increasing the distance between the axially fixed part 40 and the axially movable part 42. This increase in distance is accompanied by a volume change of at least one of the chambers 33a, 33b, 33c, but particularly of the chamber 33a. Tied at least in part to the volume change, the pressure will change in at least one of the chambers 33a, 33b, so that a contact pressure or contact force can be generated that depends at least in part on the torque level present at the input of the transmission. Tied at least in part to the volume change, the pressure will change in at least one of the chambers 33a, 33b, so that a contact pressure or contact force can be generated that depends at least in part on the torque level present at the input of the transmission.

For example, this arrangement allows a "symmetric" force to be generated on both of the disc pairs 14, 16 and 20, 22. This creates a tendency of pushing the chain 24 radially outwards at both disc pairs 14, 16 and 20, 22 simultaneously. Especially in the case where the resultant forces acting on the chain 24 at each disc pair are symmetric, the effect is that the chain will be held in place, also in relation to the radial direction. In particular, an adhesive friction force is acting between the chain 24 and the disc pairs 14, 16 and 20, 22. Due to these friction forces, it is possible to transmit a torque from the disc pair 14, 16 to the other disc pair 20, 22.

The transmission ratio between the shafts 46 and 48, i.e., between the disc pairs 14, 16 and 20, 22 can be changed by applying a ratio-changing pressure either to the disc pair 14, 16 or 20, 22 by means of the valve device 26 and the hydraulic conduit systems 36 or 34, respectively. In particular, the concept includes the provision that a ratio change in a first direction is effected by pressurizing a system consisting of at least one chamber through the hydraulic conduit system 34.

As described above, the conical discs 14, 16 will thereby be pushed closer together while, at the same time, the pressure communicated through ratio-changing conduit 36 to the disc pair 20, 22 is essentially zero.

Analogously, a ratio change in the opposite direction is achieved by pressurizing at least one of the chambers 54a, 54b through the conduit system 36, whereby the radial distance of the chain 24 from the shaft of the disc pair 20, 22 is increased. At the same time, this has the effect of contracting the contact radius of the chain at the first disc pair 14, 16, i.e., at the first disc pair, the chain 24 moves radially inwards towards the axis of rotation.

It should be noted that the ratio-changing conduits 34, 36 which allow in particular the application of increased pressure to one of the disc pairs 14, 16 or 20, 22 can also be used to maintain an existing equilibrium position of the chain between the disc pairs 14, 16 and 20, 22. For example, with a constant pressure being applied in preferably equal magnitude to both of the disc pairs 14, 16 and 20, 22 through the conduit system 32, an additional pressure for maintaining the aforementioned equilibrium can be superimposed through the conduits 36 or 34, for example in a case where the force required on the disc pairs 14, 16 and 20, 22 depends on the selected transmission ratio. As an example, if the forces required for maintainng equilibrium in the disc pairs 14, 16 and 20, 22 are of different magnitude, it is possible to pressurize at least one of the disc pairs 14, 16 or 20, 22 with an additional, superimposed pressure through the hydraulic conduit 34 or 36, respectively, to secure an equilibrium position in a case where the latter is ratio-dependent.

The valve 26 consists of a valve piston 70 received and axially movable in a long bore hole 71. In the illustrated exemplary embodiment of FIG. 1, the valve piston 70 can be subjected to an axially directed pressure force acting in opposition to the resilient force of the spring 73. The end of the long bore hole 71 can be closed off by means of a cover plug 72 which can, e.g., be screwed into an internal thread of the bore hole 71 in the valve housing 74.

The system portion 99 that is framed by a broken line in FIG. 1 can be enclosed in a housing as a hydraulic control device module. In addition, the pump 28 can be bolted onto the hydraulic control device module.

The control device of FIG. 1 has a connection 98 supplying pressure medium to other parts of the control device that are not shown in FIG. 1.

Figure 2:
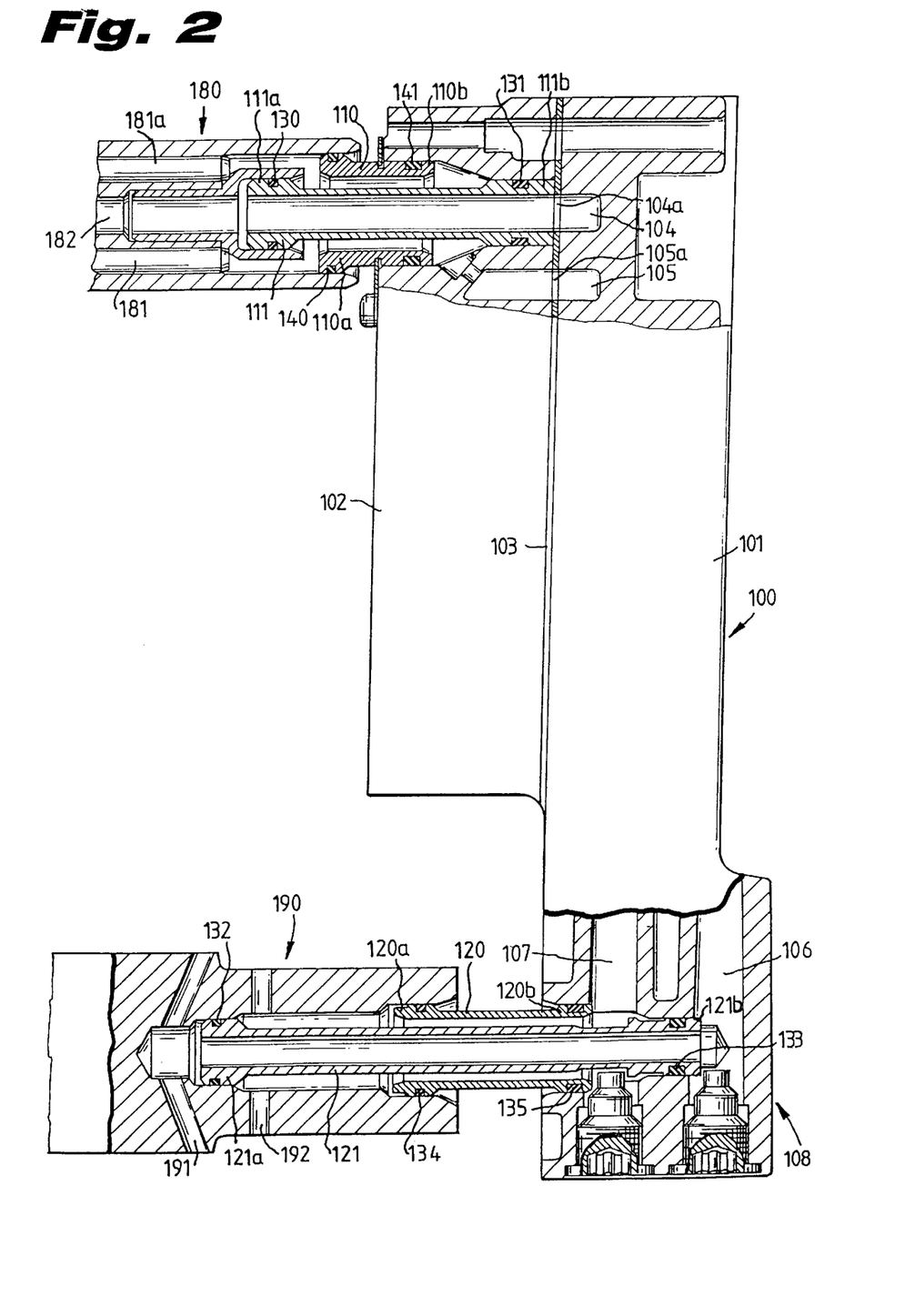
FIG. 2 represents an arrangement of transmission shafts with a control device.

FIG. 2 represents a portion of a transmission, illustrating how the control device 100 supplies pressure fluid to the channels 181, 181a, 182 in shaft 180 and to the channels 191 and 192 in shaft 190.

The control device 100 essentially consists of at least two control device plates 101 and 102 that are connected to each other through an intermediate layer 103 such as an interposed piece of sheet metal. The intermediate layer 103 can have openings 104a, 105a to connect the channels 104, 105 of the control device plates 101 and 102 with each other. If there are not openings, the intermediate layer can have the purpose of sealing the control device plates against each other. Shaft 180 in the illustrated arrangement is the shaft of the disc pair on the input side of the transmission, and shaft 190 is the shaft of the disc pair on the output side of the transmission. The fluid connection between the channels 104, 105 of the control device 100 and the shaft 180 is established by means of the two concentric or nearly concentric tubular elements 110, 111, each of which has one end engaged in the control device 100 and the other end in the shaft 180.

The channels 191 and 192 of shaft 190 are pressurized with fluid from the channels 106, 107 of the control device 100 by way of the two concentric or nearly concentric tubular elements 120, 121, each of which has one end engaged in the shaft 190 and the other end in an extension 108 that contains the channels 106, 107 and is connected to the control device 100.

The tubular elements 110, 111 and 120, 121 also serve to compensate a misalignment between the axes of the shafts and the axes of the seats where the tubular elements are received in the control device. To perform this function, the end connections of the tubular elements are designed to work like universal joints.

The respective axial end portions 110a, 110b, 111a, 111b and 120a, 120b, 121a, 121b of the tubular elements 110, 111 and 120, 121 have an increased wall thickness where sealing rings 130, 131, 140, 141, 132, 133, 134 and 135 are received in annular grooves.

Figure 3:
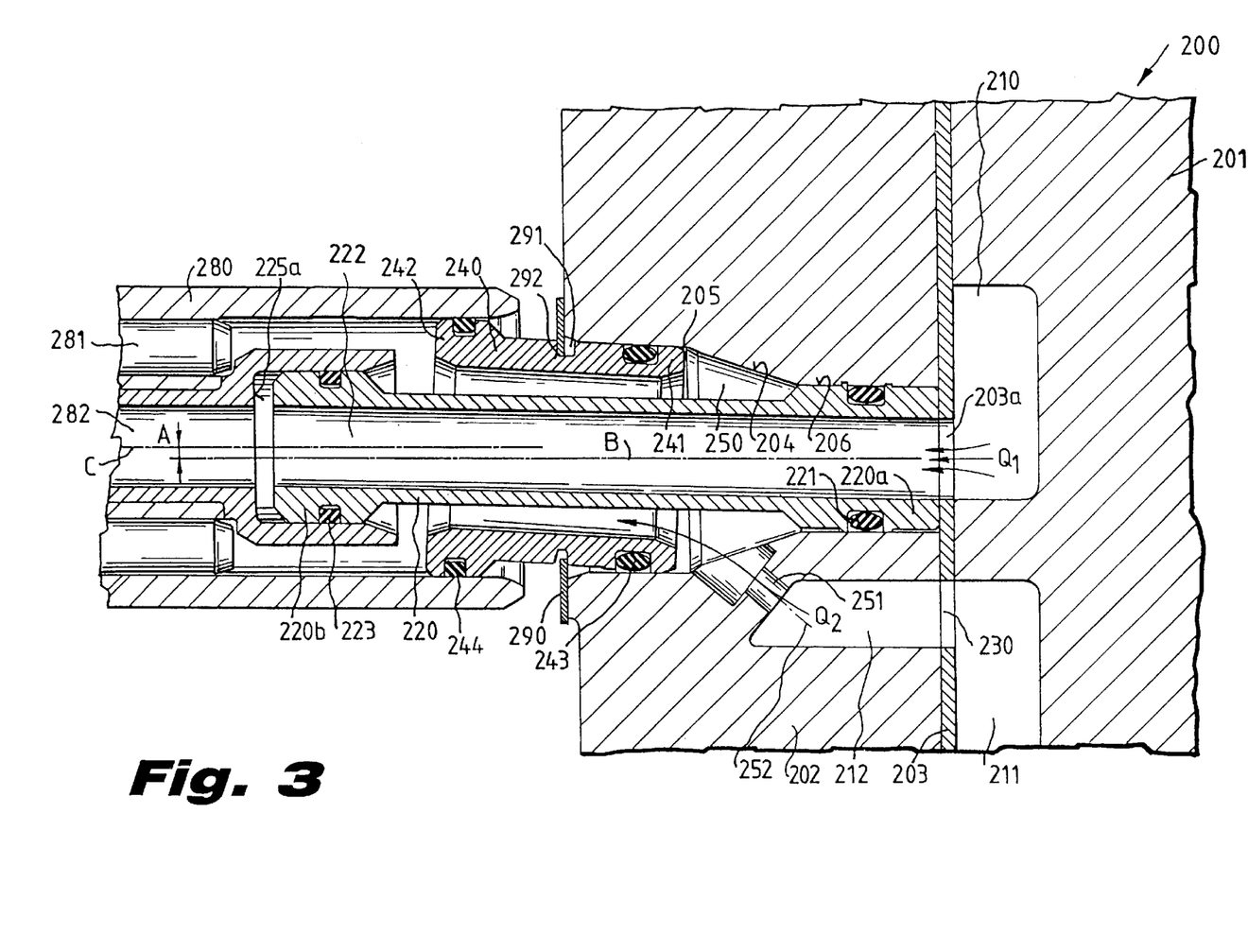
FIG. 3 represents a connection between the control device and a shaft.
Figure 4:
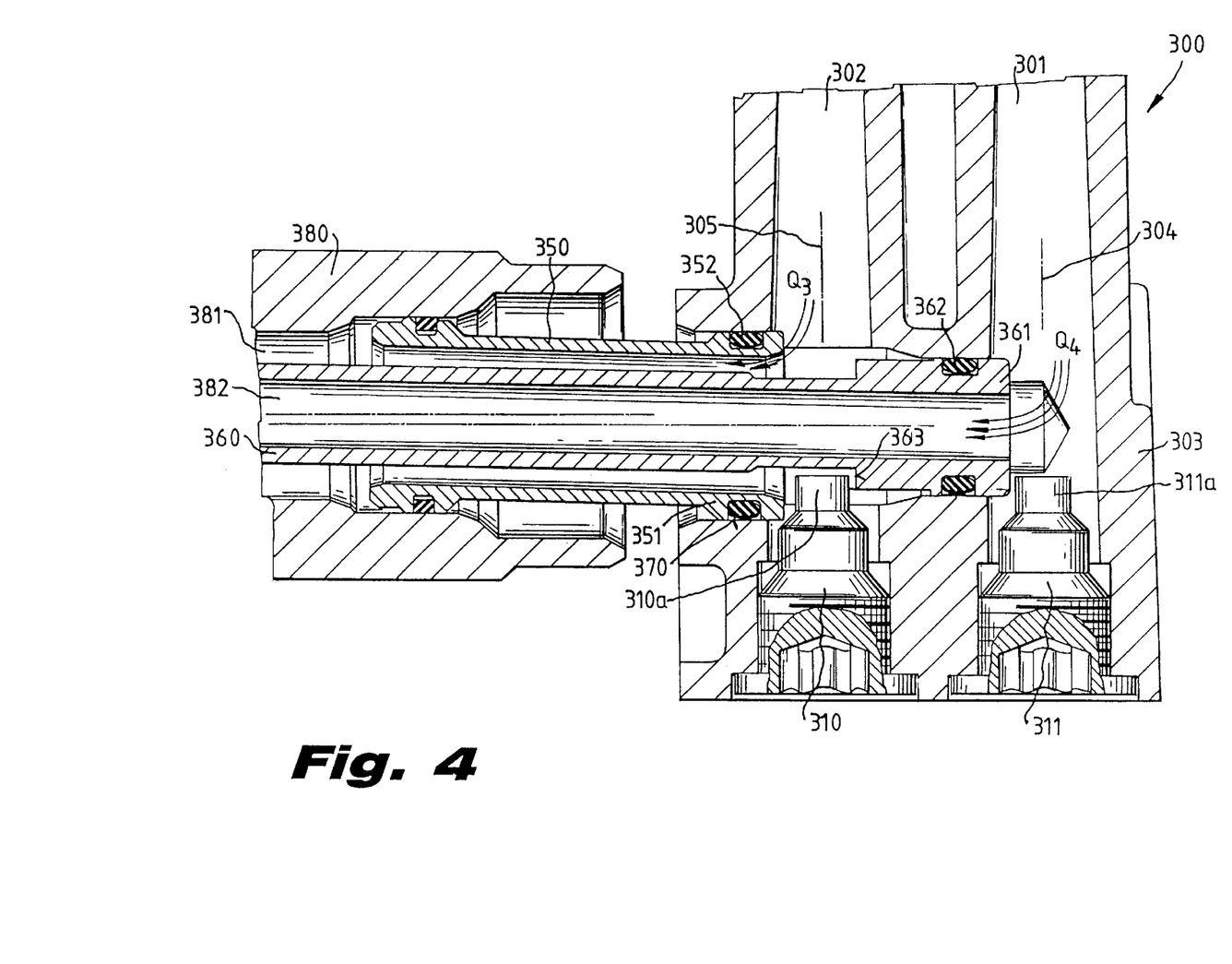
FIG. 4 represents a connection between the control device and a shaft.

Further details are shown in FIGS. 3 and 4.

FIG. 3 represents an enlarged view of the fluid connection between the control device 200 and the shaft 280 of the first disc pair. As described above, the control device 200 consists of two control device plates 201 and 202 and an intermediate layer 203. The two channels 210 and 211 of the control device plate 201 supply fluid to the channels 281 and 282 of the shaft and thus to the actuating members of the first disc pair.

The fluid connection from channel 210 to the tubular element 220 is established through an opening 203a in the intermediate layer 203. The terminal portion 220a of the tubular element 220 meets the opening 203a and can also be seated against the intermediate layer 203.

In the area of the opening 203a, the control device plate 202 has a stepped bore hole 204 consisting of two bore sections 205 and 206. The bore section 205 has a larger diameter than the section 206, with the section 206 extending to a greater depth than the section 205.

The terminal portion 220a with the seal 221 seated in a groove is fitted into the bore section 206 so that the contact interface between the seal 221 and the internal surface of the bore section 206 is impervious to the hydraulic fluid. The channel 222 of the tubular element 220 is thereby connected to the channel 210 of the control device and sealed against the exterior space, allowing the fluid stream $Q_1$ to flow from the channel 210 through the opening 203a and the channel 222 into the channel 282 of the shaft 280. Completing the hydraulic connection is a fluid-tight engagement of the terminal portion 220b of the tubular element 220 with the shaft 280 by means of a seal 223.

The sealing pressure of the seals in the grooves of the terminal portions of the tubular elements is such that the tubular elements will not be taken along by the rotation of the shafts, i.e., the tubular elements will remain at rest or nearly at rest in relation to the control device.

It is particularly advantageous if the sealing joints of the tubular elements have a degree of mobility like universal joints, so that a misalignment of the centers or axes between a shaft and the respective bore hole of the control device can be compensated by a skewed position of the tubular elements.

If the axis B of the opening 203a and the axis C of the shaft 280 are offset against each other, the mismatch can be compensated by the tubular elements. In practice, the stepped bore hole 204 is at least nearly coaxial with the shaft 280. The invention allows small deviations from coaxial alignment to be compensated.

The tubular element 220 is axially constrained between the intermediate layer 203 and a shoulder 225a in the shaft. The shoulder 225a and the intermediate layer keep the tubular element 220 axially in place, where the tubular element can bear against one or the other. Thus, the intermediate layer serves as an axial stop for the tubular element 220.

The volume stream $Q_1$ is conducted from a channel 210 of the control device plate 201 through an opening, e.g., a bore hole in the intermediate sheet metal layer, into the tubular element 220.

The volume stream $Q_2$ is conducted from a channel 211 of the control device plate 201 through a bore hole 230 to a channel 212 of the other control device plate 202 and from there through an oblique bore hole 251 into a space 250, from which the tubular element 240 is supplied with fluid. The space 250 is formed preferably in the stepped bore hole between the tubular elements 240 and 220, axially between the bore sections 205 and 206.

The angle of the axis 252 of the oblique bore hole 251 in relation to the axis of the shaft 280 can be prescribed in the design of the control device.

According to another embodiment of the invention, the channel 212 that connects to the oblique bore hole does not need to be connected by an opening such as a bore hole to the other control device plate 201.

The opposite end portion 241 of the tubular element 240 is engaged in the bore hole 205, and its seal 243 closes off the space 250 against the exterior. Analogously, the tubular element 242 is engaged in the bore hole of the shaft 280 with a seal 244 closing the interior space against the exterior.

The coaxial arrangement of the two tubular elements allows two fluid conduits in rotating shaft 280 to be connected to two ports of a control device.

The tubular element 240 is secured axially by a holder element such as a holder plate. To perform its function, the holder element 290 has a fork 292 that engages a groove of the tubular element. The holder element is connected to the housing of the control device, e.g., by a screw connection.

FIG. 4 gives a fragmentary view of an arrangement for hydraulically connecting a rotating shaft 380 to a hydraulic control device 300.

As shown in FIGS. 1, 2 and 3, the control device 300 is, for example, assembled of two control device plates with an intermediate layer and has an extension 303 with two channels 301 and 302. The channels 301 and 302 are arranged essentially side by side, and in an advantageous embodiment they are laid out parallel. The axes 304 and 305 of the channels are essentially parallel or run at only a slight angle to each other.

The channels 301 and 302 are connected to channels of the control device plate, although the connections are not shown in FIG. 4.

The channels 301 and 302 can be formed in the casting of the extension or they can be bored. The lower end portions of the channels are fitted with cover plugs 310 and 311 that seal and close the channels against the outside.

The connection of the channels 301 and 302 to the channels 381 and 382 of the shaft 380 is established by means of two tubular elements 350 and 360 that are essentially coaxial or have an approximately coaxial arrangement. The tubular elements 350 and 360 are received in the extension 303 in an essentially coaxial manner in a stepped bore hole.

Figure 5:
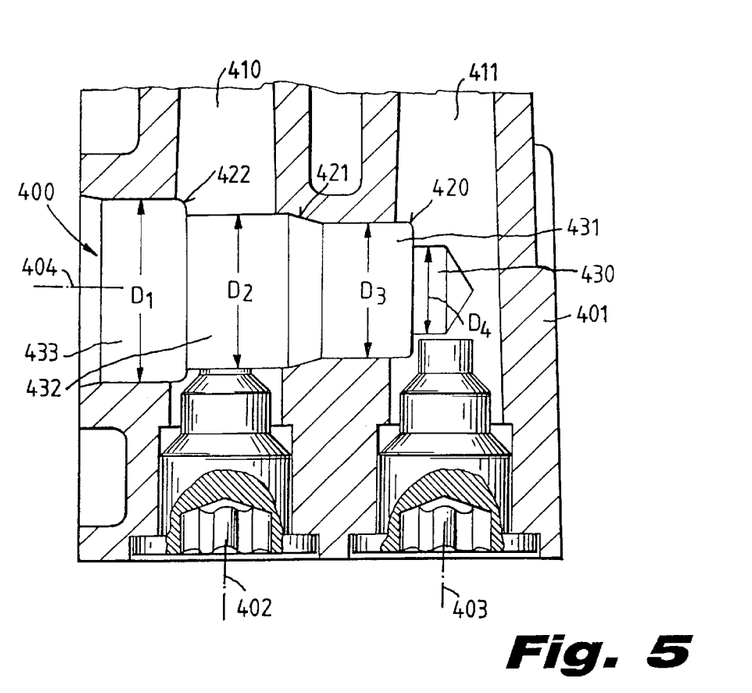
FIG. 5 represents a detail of the control device.

FIG. 5 gives a more detailed view of the bore hole leading into the extension 303.

The bore hole 400 in the extension 401, as shown in FIG. 5, runs essentially perpendicular to the axes 402 and 403 of the two channels 410 and 411. In another embodiment of the invention, it can also be of practical benefit if the axis 404 of the bore hole 400 runs at an angle other than 90° to the axes 402 and 403.

The bore hole 400 cuts into both of the channels 410 and 411.

The bore hole 400 is designed as a stepped bore hole with the individual bore sections 430, 431, 432 and 433 produced by the drilling of four different diameters to different respective depths. The bore section 430 with the smallest diameter $D_4$ has the largest bore depth and cuts into both of the channels 410 and 411. The bore section 431 with the next larger diameter $D_3$ has a somewhat lesser bore depth than the section with the diameter $D_4$. The bore section 431, likewise, cuts into the channels 410 and 411. A shoulder 420 marks the transition from the bore section 431 with the diameter $D_3$ to the bore section 430 with the diameter $D_4$. The shoulder 420 serves as axial constraint of a tubular element.

The bore section 432 with the next larger diameter $D_2$ (in comparison to $D_3$) has again a lesser bore depth than the section 431 with the diameter $D_3$. The bore section 432 cuts only into the channel 410. The transition 421 from the bore section 431 to the bore section 432 has an essentially continuous tapered profile. However, in a further embodiment, the transition can also be designed as a shoulder.

The bore section 433 with the largest diameter $D_1$ has the shallowest bore depth and cuts only into the channel 410. The transition from the bore section 433 to the bore section 432 forms a shoulder that serves as axial constraint of a tubular element.

FIG. 4 illustrates the arrangement of the two tubular elements or tube-shaped elements 350 and 360, where the two end portions 361 and 351 are seated in the stepped bore hole 370. The end portions 361 and 351 with their respective seals 352 and 362 seated in grooves are received in the bore sections 433 and 431 that are shown in FIG. 5. The seals have a snug fit against the cylindrical walls of the bore sections and provide a fluid-tight interface. The axially facing end surface of the tubular element 360 is axially constrained by the shoulder 420 of FIG. 5, and the end surface of the tubular element 350 is axially constrained by the shoulder 422. The axial position of the tubular elements is thereby secured.

The arrangement of the seal 362 (FIG. 4) in the bore section 431 (FIG. 5) performs the function of guiding the fluid flow $Q_4$ from the channel 301 to the channel 382 of the tube-shaped element 360.

Because the channel is arranged axially between the seals 352 and 362, and because the seal 352 seals the tube-shaped element against the exterior, the fluid flow $Q_3$ has to take the path into the channel 381 between the walls of the tubular elements 350 and 360.

FIG. 4 further illustrates an extension 303 providing a fluid connection to the shaft 380 by way of the channels 301 and 302 and the tubular elements 350 and 360. The ends of the channels 301 and 302 are closed by means of cover plugs 310 and 311 that are screwed into threads at the ends of the channels. The cover plugs 310 and 311 have end portions 310a and 311a that can serve as stops or axial constraints for the tubular elements 350 or 360. For example, the tubular element 360 can be axially retained by means of the cover plug 310, because the end portion 310a intercepts the collar of the end portion 361. The collar or shoulder 363 of the tubular element 360 abuts the end portion 310a, whereby the tubular element is kept in place.

Figure 6:
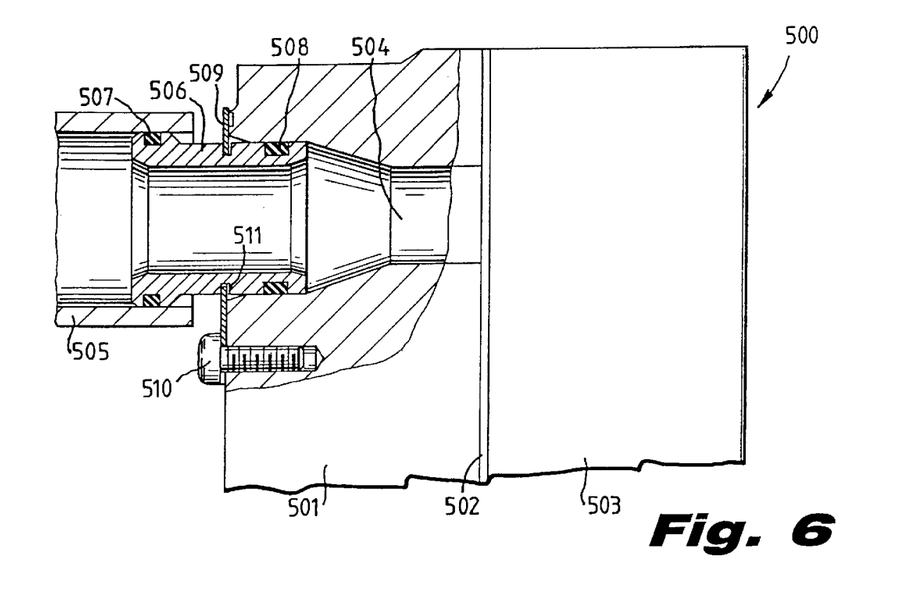
FIG. 6 represents a detail of the control device.

FIG. 6 presents a fragmentary view to illustrate how the tubular element 240 of FIG. 3 is axially secured. FIG. 6 gives a schematic view of the area where the tube-shaped element 506 meets the control device 500. The control device 500 essentially consists of two housing halves 501 and 503 containing an arrangement of valves and connecting channels, with the mating joint between the halves being sealed by a sealing layer or intermediate layer 502. The sealing layer has openings for the connections between the two housing halves.

At least one of the housing halves contains a channel 504 that is open to the outside and in which a tubular element 506 is at least partially engaged. The element 506 is also at least partially engaged in a bore hole of a shaft 505 of a transmission and thereby establishes a passage for fluid to flow between the control device 500 and the shaft 505, where the control device 500 is fixed on the transmission housing while the shaft 505 is rotatable in relation to the transmission housing.

The tubular element 506 has seals 507 and 508 seated in grooves, in order to seal the fluid connection between the control device 500 and the shaft 505. The tubular 506 element is axially secured by a retainer fork 509 that is engaged in a groove 511 of the tubular element 506 and connected to the housing 500 by a screw 510. The tubular element 506 is further covered in DE 198 26 747 which, as mentioned previously, is included by reference in the disclosure of the present application. The retainer fork is a part of the holder element for securing the tubular part. The holder element, which is preferably configured as a single, integral unit together with the spring element and the safety element, is held in position by the screw that connects the holder element to the housing of the control device and by the seating engagement of the lever in the slot of the ridge.

This application is further related to the German patent applications DE 199 43 009, DE 199 43 012, and DE 199 43 680, whose content (and also the content of subsequent applications based on the priority of the original German applications) is expressly included by reference in the disclosure of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A transmission with a hydraulic control system for a controlled pressurization of actuating members that are arranged on at least one rotary shaft, said hydraulic control system comprising a hydraulic control device with at least two control device plates, an intermediate layer between the control device plates, and at least one hydraulic connection between the hydraulic control device and the rotary shaft, said hydraulic connection comprising:

an inner tubular element, an outer tubular element, and a tubular passage channel between the tubular elements, said tubular elements and passage channel being coaxial and each of the tubular elements having a first axial end portion and a second axial end portion, receiving portions of the shaft, and a stepped bore hole in one of the control device plates, wherein the first axial end portions are seated in the receiving portions of the shaft, the second axial end portions are received in the stepped bore hole, and the intermediate layer serves as axial constraint of one of the tubular elements, and wherein one of the control device plates comprises a fluid channel radially off-centered from the stepped bore hole, a connecting bore hole that is not parallel to the stepped bore hole, and an intermediate space of the stepped bore hole between the tubular elements, wherein the tubular passage channel receives a flow of fluid from the radially off-centered channel through the connecting bore hole and the intermediate space.

2. The transmission of claim 1, wherein the intermediate space lies between the seals of the respective second end portions of the inner tubular element and the outer tubular element.

3. A transmission with a hydraulic control system for a controlled pressurization of actuating members that are arranged on at least one rotary shaft containing shaft channels, said hydraulic control system comprising a hydraulic control device with at least two control device plates, an intermediate layer between the control device plates, a control-device extension containing at least a first control-device-extension channel and a second control-device-extension channel substantially parallel to each other, and at least one hydraulic connection between the hydraulic control device and the rotary shaft, said hydraulic connection comprising:

an inner tubular element, an outer tubular element, and a tubular passage channel between the tubular elements, said tubular elements and passage channel being coaxial and each of the tubular elements having a first axial end portion and a second axial end portion, receiving portions of the shaft, and a stepped bore hole in the control device extension, wherein the first axial end portions have a sealed engagement in the receiving portions and the second axial end portions are received in the stepped bore hole of the control device extension, and wherein further the tubular elements connect the control-device-extension channels to the shaft channels.

4. The transmission of claim 3, wherein the hydraulic connection further comprises seals, the stepped bore hole comprises walls and at least two axial bore sections of different diameter, the second end portions are seated in the bore sections of different diameter, and the seals are arranged between the second end portions and the walls.

5. The transmission of claim 4, wherein the stepped bore hole comprises four axial bore sections of different diameter.

6. The transmission of claim 4, wherein the stepped bore hole cuts into the control-device-extension channels.

7. The transmission of claim 4, wherein the stepped bore hole comprises axial bore sections of different diameter and at least one shoulder located at a transition between bore sections, said shoulder serving to axially constrain one of the tubular elements.

8. The transmission of claim 3, wherein the inner tubular element receives hydraulic fluid from the first control-device-extension channel through a section of the stepped bore hole.

9. The transmission of claim 4, wherein the control-device extension comprises an intermediate space of the stepped bore hole between the tubular elements, said intermediate space lying between the seals of the respective second end portions of the inner tubular element and the outer tubular element, and wherein further the tubular passage channel receives hydraulic fluid from the second control-device-extension channel by way of the intermediate space.

10. The transmission of claim 3, wherein the control-device-extension channels are closed by cover plugs.

11. The transmission of claim 10, wherein at least one cover plug is arranged to take up axial forces acting in the direction towards the shaft so that the plug can serve as a retaining constraint for a tubular element.

12. The transmission of claim 3, further comprising at least one holder element to axially secure at least one of the tubular elements.

13. The transmission of claim 12, wherein the holder element comprises a fork and the tubular element comprises a groove, wherein further the holder element is made of sheet metal, and the fork engages the groove.

14. The transmission of claim 12, wherein the holder element is fastened to the control device.

* * * * *